2,881,151

CHLORINATED RESINS STABILIZED WITH BIS-PHENOL COMPOUNDS

David W. Young, Homewood, Ill., and Wilbur F. Fischer, Cranford, N.J., assignors to Esso Research and Engineering Company, a corporation of Delaware No Drawing. Application July 15, 1955
Serial No. 522,373

12 Claims. (Cl. 260—45.95)

This invention relates to improvements in the stabilization of substantially saturated aliphatic compounds containing about 25 to 70 weight percent of chlorine and having a high molecular weight, e.g. above 250, alone or plasticized or otherwise diluted with a stable liquid or solid diluent. In particular, this invention relates to compositions of chlorinated unbranched, straight-chain hydrocarbons such as polyvinyl chloride type resins, stabilized with a bisphenol compound such as 2,2-bis(p-hydroxyphenyl)-propane.

This application is a continuation-in-part of application Serial No. 168,371, filed June 15, 1950, now abandoned.

High-molecular weight chlorine-containing resin-like solids such as polyvinyl chloride, vinyl chloride-acetate copolymers, polyvinylidene chloride, chlorinated polyethylene and chlorinated paraffin wax have been finding ever increasing use in various fields because of their unusual flame resistance, resistance to chemicals, impermeability to water and other numerous beneficial properties. The vinyl chloride type plastics have been used especially in sheet form for shoe soles, upholstery material, curtains, belts, and so on, while chlorinated polyethylene and particularly chlorinated wax have found considerable popularity as coatings on duck canvas, to make the latter both water-proof and fire-proof. However, the utility of the chlorine-containing resins has been limited by their tendency to split out hydrogen chloride, to depolymerize, to deteriorate physically and to discolor in an oxidizing atmosphere, especially in sunlight. Prior efforts to combat this instability by means of various stabilizing agents have been only partially successful. The agents used heretofore fall into two categories, namely, anti-oxidants which take up oxygen so as to reduce its deleterious effect on the resin, and various metal salts or basically reactive agents such as lead stearate, basic lead carbonate, dibutyl tin dilaurate and the like, which combine with the hydrogen chloride produced by decomposition of the resin and thus prevent the liberated acid gas from exerting its harmful influence on the resin. However, even the best stabilizers heretofore known left much to be desired as to their effectiveness.

A new class of stabilizers for chlorine-containing aliphatic resins has now been discovered which appears to operate on a new principle. The new stabilizers used in the present invention are bisphenol compounds having the formula $R_1$—X—$R_2$, wherein X is selected from the group consisting of 2,2-alkylidene groups of 3 to 6 carbon atoms, and 3,3-alkylidene groups of 4 to 7 carbon atoms, and wherein $R_1$ and $R_2$ are unsubstituted hydroxyphenyl groups, preferably para-hydroxyphenyl groups, but alternatively may be monochlorinated hydroxyphenyl groups or mono-alkylated hydroxyphenyl groups having 1 to 3 carbon atoms per alkyl group. Such compounds can be obtained by condensing in a known manner two mols of a simple or a chlorine-substituted phenol with one mol of a ketone such as acetone, methyl ethyl ketone, methyl n-butyl ketone or methyl isobutyl ketone. The preferred stabilizer of this class is 2,2-di-(p-hydroxyphenyl)-propane, also referred to herein as diphenylol propane. Other suitable compounds are 2,2-bis(4-hydroxyphenyl) butane; 3,3-bis(4-hydroxyphenyl) hexane; 2,2-bis(4-hydroxy-3-methylphenyl) propane; 2,2-bis(4-hydroxy-3-isopropylphenyl) propane; 2,2 - bis(2 - hydroxy - 5 - chlorophenyl) butane; as well as related substances.

These compounds have been used heretofore as anti-oxidants for various hydrocarbon materials such as natural and synthetic rubber, as well as for vinylidene chloride monomer. However, it has now been discovered that these compounds act as unusually effective stabilizers for chlorine-containing aliphatic resins, since they act therein not only as anti-oxidants but also, once a hydrogen chloride molecule is split off from the resin, they appear to alkylate directly onto the resinous polymer and thereby prevent the usual breakdown of the latter. And apparently it is this alkylating ability of the stated bisphenol compounds which sets them off from other known phenolic anti-oxidants such as 2,6-di-t-butyl-4-methyl cresol and similar di- or trialkylated monocyclic phenols or even the ring-alkylated bisphenol compounds such as 2,2-bis(2-hydroxy-3-t-butyl-5-methylphenyl)-propane. Also, as compared with most prior art stabilizers, the bisphenols of the present invention possess a great advantage in their relatively high molecular weight as well as their high boiling point.

In accordance with the invention, the unalkylated bisphenol compounds are mixed into the resin-like solid in concentrations ranging from 0.1 to 5 weight percent. The invention will best be understood from the following illustrative examples.

EXAMPLE 1

A commercial resinous copolymer of about 95% vinyl chloride and 5% vinyl acetate was worked on a rubber mill at 300° F. in the presence of 0.25 weight percent of various stabilizing agents and the time within which the resin darkened on the mill was taken as an indication of stabilizer effectiveness as shown in Table I.

*Table I*

| Stabilizer: | Time to Darken on mill, min. |
|---|---|
| None | 2–5 |
| 2,2 - bis(2 - hydroxy - 3 - t - butyl - 5 - methyl-phenyl) - propane | 10 |
| 2,2 - bis(2 - hydroxy - 3 - t - butyl - 5 - methyl-phenyl) - butane | 7 |
| 2,3 - bis(2 - hydroxy - 3 - t - butyl - 5 - methyl-phenyl) - 2,3 - dimethylbutane | 8 |
| 2,2 - bis(4 - hydroxyphenyl) - propane | 13 |

These data indicate the very decided superiority of the 2,2-bis(hydroxyphenyl)-propane over similar bisphenol compounds whose alkylating ability was blocked by the presence of various alkyl groups on the aromatic ring.

EXAMPLE 2

Chlorinated wax has been used previously as a resin-like solid to form flame-proof coatings, but such products lacked proper light and heat stability. Bisphenols such as diphenylol propane are highly effective in overcoming this short-coming as shown by the following tests wherein a solid white, chlorinated wax having a 70% chlorine content, obtained by chlorination of a paraffin wax having a melting point of 132° F., was blended with varying amounts of diphenylol propane and the blend worked on a rubber mill at 300° F., for varying lengths of time and the resulting color changes noted.

Table II

| Test No. | Amount of stabilizer added | Time on rubber mill | | |
|---|---|---|---|---|
| | | 10 min. | 20 min. | 30 min. |
| 1 | None | Yellow color | Brown color | Black color. |
| 2 | 0.1% diphenylol propane | do | Yellow color | Do. |
| 3 | 0.5% diphenylol propane | do | do | Yellow color. |
| 4 | 3% diphenylol propane | White color | White color | Do. |
| 5 | 0.5% stabilizer A [1] | Yellow color | Brown color | Dark brown color. |
| 6 | 0.8% stabilizer | do | do | Do. |

[1] 2,6-di-tert-butyl-4-methyl phenol.

The results indicate that diphenylol propane, especially in concentrations of at least 0.5%, is highly effective in preventing discoloration of chlorinated wax, whereas prior art anti-oxidants of the alkylated phenol type are relatively useless.

EXAMPLE 3

The present invention is also highly effective for stabilizing polyvinyl chloride plastics wherein chloroparaffins are used as plasticizers. The economy, availability, flame resistance and electrical properties of chloroparaffins having about 20 to 35 carbon atoms and 30 to 70 weight percent of combined chlorine have long suggested the use of these materials in chlorinated polyvinyl plastics. However, the major drawback to the application of chloroparaffins or chlorinated waxes in this medium has been the lack of suitable means for stabilizing the resulting mixtures. This has now been overcome by the discovery of the unusual effectiveness of the stated bisphenol compounds.

For instance, the effectiveness of diphenylol propane was compared with other known stabilizers in the following set of runs. Resin compounds were prepared on a rubber mill at 300° F. according to the following formula:

| | Parts by weight |
|---|---|
| Vinyl chloride (95%)-acetate (5%) resin (Vinylite VYNW) | 100 |
| Di-octyl phthalate | 25 |
| Chlorinated wax[1] (40% chlorine content) | 25 |
| Clay | 12 |
| Stabilizer (as noted in Table III) | 5 |

[1] Obtained by chlorination of paraffin wax having 132° F. melting point.

The stability of the resulting resin compounds was tested in two ways. In one test, the stability was measured in terms of time elapsed before the compound darkened substantially while being worked on the rubber mill at 300° F. For the other test, the compounds were molded into 6″ by 6″ x 0.25″ slabs in a rubber mold at 300° F. for 5 minutes, the slabs placed in a circulating air oven at 220° F., and deterioration with time was noted. The results are summarized in Table III.

Table III

| Compound No. | Stabilizer | Stability on mill, min. | Stability of molded slabs, hours |
|---|---|---|---|
| 1 | None | 4 | 50 |
| 2 | Basic lead carbonate (PbO.PbCO₃) | 12 | 150 |
| 3 | Tribasic lead sulfate | 13 | 150 |
| 4 | Stabelan A [1] | 13 | 200 |
| 5 | Strontium octoate | 14 | 300 |
| 6 | Dibutyl tin dilaurate | 15 | 200 |
| 7 | Dibasic lead phosphite | 21 | 500 |
| 8 | Diphenylol propane | 25 | 600 |

[1] Chemical analysis: 9.17% Na, 5.21% B, 3.59% P, 7.78% Ca, 51.33% Ash.

The data once again show the outstanding effectiveness of diphenylol propane as a stabilizer for chlorinated resin compositions. In particular, the tests proved that the compound containing diphenylol propane could be heated 25 minutes at 300° F. on a mill before changing in color or odor. The compound had a tensile strength of 2700 lbs./sq. in., 350% elongation, 200% modulus of 2380 lbs./sq. in., Shore A hardness of 0.97, and excellent flame resistance.

EXAMPLE 4

The effectiveness of diphenylol propane as a heat stabilizer for chlorinated high molecular weight hydrocarbon polymers such as chlorinated polyethylene, is illustrated in Table IV.

Table IV

| Test No. | Composition | Description |
|---|---|---|
| 1 | Chlorinated polyethylene (27–30% Cl). | Yellowish brown after 20 min. on rubber mill at 330° F. |
| 2 | Chlorinated polyethylene (27–30% Cl) plus 3% diphenylol propane. | White after 30 min. on rubber mill at 330° F. |

The effectiveness of diphenylol propane in chlorinated polyethylene is quite remarkable and contrasts with the relative ineffectiveness of this stabilizer in pure polyethylene.

EXAMPLE 5

The bisphenol stabilizers are also useful in polymeric vinyl chloride compositions plasticized by means of nitrilediolefin polymers as illustrated in Table V.

Table V

| Compound (parts by weight) | No. 1 | No. 2 | No. 3 | No. 4 | No. 5 | No. 6 |
|---|---|---|---|---|---|---|
| Vinyl chloride (95%)–acetate (5%) copolymer | 100 | 100 | 100 | 100 | 100 | 100 |
| Nitrile rubber [1] | 35 | 35 | | | | |
| Nitrile tripolymer #1 [2] | | | 35 | 35 | | |
| Nitrile tripolymer #2 [3] | | | | | 35 | 35 |
| Lead stearate | 1 | 1 | 1 | 1 | 1 | 1 |
| Dibasic lead phosphite | 2 | 2 | 2 | 2 | 2 | 2 |
| Dioctyl phthalate | 25 | 25 | 25 | 25 | 25 | 25 |
| Diphenylol propane | | 0.09 | | 0.09 | | 0.09 |

[1] Butadiene (65%)–acrylonitrile (35%) copolymer; rubber-like; Mooney viscosity 90.
[2] Acrylonitrile (50%)–butadiene (30%)–isobutylene (20%) tripolymer; resinous; prepared by emulsion polymerization.
[3] Acrylonitrile (60%)–butadiene (30%)–isobutylene (10%) tripolymer; resinous; prepared by emulsion polymerization.

In making up the compounds listed above the diphenylol propane, in the form of a methyl ethyl ketone solution, was first added to the respective nitrile polymer on a cold mill and the vinyl plastic and other ingredients added thereto subsequently. The complete compounds were fluxed at 300° F. for 1½ minutes. Films of 0.015″ thickness were calendered at 270–300° F. from all stocks. Thereafter samples of the resulting films were heat aged in an air oven at 250° F. for 8 hours and other samples of the films were tested for resistance to ultra-violet light in a Fadeometer at 125° F. for 8 hours. The results obtained are summarized in Table VI below.

Table VI

| Compound | No. 1 | No. 2 | No. 3 | No. 4 | No. 5 | No. 6 |
|---|---|---|---|---|---|---|
| Color after oven aging, 8 hours | Dark brown | Tan | Dark brown | Straw color | Dark brown | Tan. |
| Color after Fadeometer, 20 hours | Brown | Light brown | Tan | Light tan | Tan | Light tan. |

The results show that the diphenylol propane is remarkably effective in improving the color stability of the polymeric blends described above. In making the comparisons it is important to note that the even numbered compounds greatly excel the odd numbered compounds which contain the conventional metal-containing resin stabilizers. Moreover, it should be noted that even the odd numbered compounds contain the usual minor amount of a conventional anti-oxidant in the form of 2,6-di-t-butyl-4-methyl phenol, which in all cases was incorporated into the respective nitrile polymers subsequently to their synthesis. Thus, the results not only show the effectiveness of diphenylol propane, but at the same time they illustrate the inability of conventional phenol-type stabilizers to overcome the color-forming tendencies of chlorinated vinyl compounds. Since in most uses of polyvinyl resins their color stability is one of the foremost considerations, the importance of the present invention cannot be overemphasized.

EXAMPLE 6

When a nitrile rubber stabilized with between about 0.5 to 5%, e.g. with 1% of diphenylol propane is hot fluxed with a polyvinyl chloride resin, severe roughening of the resulting stock occurs. This is apparently due to the fact that the highly reactive bisphenol anti-oxidant originally present in an amount entirely adequate to protect the rubber, is gradually removed from the latter by alkylation onto the vinyl chloride polymer, and the nitrile rubber, deprived of its anti-oxidant, thereafter begins to cyclize and lose its compatibility with the vinyl chloride polymer. Because of this, when polyvinyl chloride resins are plasticized with nitrile rubber it is most desirable to use both a bisphenol anti-oxidant of the type described herein as well as about 1 to 5 percent (based on the rubber) of a ring-alkylated phenol anti-oxidant such as a dibutyl cresol or a diamyl cresol. Though either of these types of anti-oxidant is highly effective in stabilizing nitrile rubber alone, either type alone, even when used in increased amounts, is far inferior to a combination of the two types when used in blends of nitrile rubber with a polyvinyl chloride type plastic.

The peculiar cooperation of the two types of anti-oxidant is illustrated by the following test wherein 100 parts of a rubbery copolymer of 65% butadiene and 35% of acrylonitrile (90 Mooney) was mixed with 200 parts of a resinous copolymer of 95% vinyl chloride and 5% vinyl acetate (Vinylite VYNW), 6 parts of a sodium organo phosphate known as "Vanstay 16," 3 parts of lead stearate and 1 part of diphenylol propane. When the resulting stock was fluxed at 280 to 300° F., severe roughening occurred. In contrast when 1 part of 2,6-di-t-butyl-4-methyl phenol was added to a like stock prior to the fluxing step, roughening was avoided. Moreover, Fadeometer tests of 90 hours' duration indicated no apparent color change in the case of the rubber-resin blend containing both the alkylated phenol and the bisphenolic anti-oxidant, whereas samples from the blends to which no alkylated phenol was added showed a noticeable color change. Conversely, it has already been shown in Example 5 that the alkylated phenol alone likewise affords only inadequate protection to blends of a vinyl chloride polymer and a diolefin-nitrile polymer.

EXAMPLE 7

While in the foregoing examples diphenylol propane has been used to illustrate the merits of the present invention, the subsequent data show that other bisphenol compounds of the proper type are also similarly useful, though most of them are not true equivalents of diphenylol propane because of their somewhat inferior ability to give full protection against loss of clarity.

In comparing the various bisphenols, samples were prepared by blending the various indicated ingredients with the polyvinyl chloride-acetate resin on a rubber mill at a temperature of 300° F. according to the following general compounding recipe:

```
                                                        Parts
Polyvinyl chloride-acetate resin (Geon 101) _____  100
Diisooctyl phthalate _____   50
Dibasic lead stearate _____    2
Bisphenol (as indicated) _____    0.13
```

When a uniform blend was obtained, it was molded into 6" x 6" x 0.075" pads at 325° F. and these pads were subjected to accelerated aging in an air circulating oven maintained at 212° F. The physical properties and transparency or light transmission of the original samples and also of samples aged for 4 and 7 days respectively were determined.

The following bisphenol stabilizers were used in the several resin compositions evaluated in Table VII:

Table VII

| Composition No. | Stabilizer | Code |
|---|---|---|
| 1 | None | None |
| 2 | 2,2-bis(4-hydroxyphenyl)propane | A |
| 3 | 2,2-bis(4-hydroxyphenyl)butane | B |
| 4 | 2,2-bis(4-hydroxy-3-methylphenyl)propane | MeA |
| 5 | 2,2-bis(4-hydroxy-3-isopropyl phenyl)propane | $C_3A$ |
| 6 | 2,6-bis(2-hydroxy-5-methylbenzyl)-4-methyl phenol | X |

| Composition No. | 1 | 2 | 3 | 4 | 5 | 6 |
|---|---|---|---|---|---|---|
| Stabilizer (code) | None | A | B | MeA | $C_3A$ | X |
| Original: | | | | | | |
| Tensile, lbs./sq. in | 3,045 | 3,020 | 2,995 | 3,025 | 2,930 | 2,950 |
| Elongation, percent | 290 | 290 | 310 | 310 | 300 | 305 |
| Modulus at 100% elong | 2,000 | 1,995 | 1,885 | 1,895 | 1,885 | 1,815 |
| Light transmission, percent | 76 | 77 | 80 | 81 | 74 | 77 |
| Oven aged, 4 days at 100° C.: | | | | | | |
| Tensile, lbs./sq. in | 2,660 | 2,995 | 3,010 | 3,050 | 3,090 | 3,105 |
| Elongation, percent | 225 | 275 | 275 | 260 | 265 | 280 |
| Modulus at 100% | 2,295 | 2,325 | 2,265 | 2,240 | 2,350 | 2,180 |
| Tensile retained, percent | 87 | 99 | 101 | 101 | 101 | 105 |
| Light transmission, percent | 26 | 78 | 79 | 77 | 65 | 61 |
| Oven aged, 7 days at 100° C.: | | | | | | |
| Tensile, lbs./sq. in | 2,195 | 2,980 | 2,920 | 2,985 | 2,900 | 2,920 |
| Elongation, percent | 105 | 265 | 270 | 275 | 255 | 255 |
| Modulus at 100% | 1,605 | 2,305 | 2,250 | 2,240 | 2,280 | 2,390 |
| Tensile retained, percent | 72 | 99 | 98 | 99 | 99 | 99 |
| Elongation retained | 36 | 91 | 87 | 89 | 85 | 84 |
| Light transmission, percent | 18 | 83 | 83 | 79 | 66 | 56 |

The results summarized in Table VII illustrate that diphenylol propane (composition 2) and diphenylol butane (composition 3) are outstanding stabilizers for plasticized polyvinyl chloride resins. In the presence of these agents the resinous compositions retain their clarity completely and their elastic properties remain substantially unaltered even after severe aging tests. Composition 4 illustrates that slight alkylation of the phenol ring makes the solubility of the bisphenol stabilizer in the original plastic composition better as indicated by improved light transmission, but the light transmission data after aging indicate that the methylated bisphenol is a less potent stabilizer than the unalkylated bisphenols. This increasingly detrimental effect of alkylation is still further illustrated by composition 5 wherein the stabilizer contains isopropyl-substituted phenol groups. The potency of this stabilizer to prevent opaqueness is substantially inferior not only to its unalkylated homologue, but even to its methylated one.

The adverse effect of chemical complexity on the activity of the bisphenol stabilizer, particularly in regard to its ability to prevent opaqueness, is even more clearly apparent in composition 6 wherein the stabilizer used had the formula

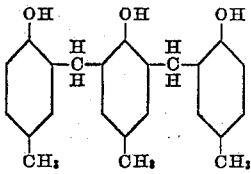

In the presence of this stabilizer a loss of light transmission of about 23% was incurred after 7 days at 100° C., as opposed to a slight actual increase in light transmission in compositions 2 and 3 containing the preferred stabilizer species.

The several examples given above show the effectiveness of a certain class of bisphenol compounds as stabilizers for solid resin-like chlorinated aliphatic hydrocarbons possessing substantially no unsaturation. The essential characteristics of the novel stabilizers are that their two phenol groups are joined together by means of an intervening alkyl group; and that the phenol rings themselves possess an alkylating ability. The latter characteristic requires that each phenol group must have at least three, and preferably four, unsubstituted hydrogens in the ring. And if any substituents are present, the latter must be of relatively small size, e.g., a chlorine atom, or an alkyl radical not larger than propyl. Where the presence of such substituents may be desirable to obtain a stabilizer more readily soluble in the resin, it must be realized that the stabilizer potency is concomitantly reduced by such substitution, and that the ring-substituted bisphenols are, therefore, not true equivalents of the preferred unsubstituted bisphenol stabilizers such as 2,2-bis(4 - hydroxyphenyl) - propane or 2,2-bis(4-hydroxyphenyl) butane. Usable bisphenols having a substituent on the phenol ring are illustrated by 2,2-bis(4-hydroxy-5-methyl phenyl) propane, 2,2-bis(4-hydroxy-5-isopropyl phenyl) propane and bis(2-hydroxy-5-chlorophenyl) methane.

However, it will be understood that the foregoing examples have been presented for purposes of illustration rather than limitation, and that various alternatives or modifications thereof are possible without departing from the scope and spirit of the present invention.

We claim:

1. A composition of matter comprising about 100 parts by weight of a chlorine-containing substantially saturated aliphatic resin like solid having a molecular weight above about 250 and having a combined chlorine content of about 25 to 70%, and, as a stabilizer therefor about 0.5 to 5.0 parts by weight of a bisphenol compound having the formula R₁—X—R₂ wherein X is selected from the group consisting of 2,2-alkylidene groups of 3 to 6 carbon atoms, and 3,3-alkylidene groups of 4 to 7 carbon atoms, and wherein R₁ and R₂ are selected from the group consisting of hydroxyphenyl radicals, monochlorinated hydroxyphenyl radicals, and monoalkyl substituted hydroxyphenyl radicals having 1 to 3 carbon atoms per alkyl group.

2. A composition of matter comprising a major proportion of a substantially saturated aliphatic chlorinated hydrocarbon material having a molecular weight above 250 and containing about 25 to 70% of chlorine, said material being selected from the group consisting of polyvinyl chloride, vinyl chloride-vinyl acetate copolymers, polyvinylidene chloride, chlorinated polyethylene, and chlorinated paraffin wax, and as a stabilizer therefor, 0.1 to 5.0 weight percent based on the weight of said chlorinated hydrocarbon material of a bis-phenol compound having the formula

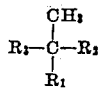

wherein R₁ is an alkyl radical of 1 to 4 carbon atoms and wherein R₂ and R₃ are hydroxyphenyl groups.

3. A composition of matter according to claim 2 wherein the bis-phenol compound is 2,2-di(p-hydroxyphenyl) propane.

4. A composition of matter comprising 100 parts by weight of a chlorinated paraffin wax having a chlorine content between 30 to 70%, and 0.5 to 5 parts by weight of 2,2-di(p-hydroxyphenyl) propane as a stabilizer therefor.

5. A composition of matter comprising 100 parts by weight of a resinous vinyl chloride polymer and, as a stabilizer therefor, 0.1 to 5.0 parts by weight of 2,2-di(p-hydroxyphenyl) propane.

6. A composition of matter comprising 100 parts by weight of a high molecular weight copolymer of about 95% vinyl chloride and 5% vinyl acetate, 15 to 50 parts by weight of a chlorinated paraffin wax having a chlorine content of 30 to 70%, and 1 to 5 parts by weight of 2,2-di(p-hydroxyphenyl) propane as a stabilizer therefor.

7. A composition of matter comprising 100 parts by weight of a resinous copolymer of a major proportion of vinyl chloride and a minor proportion of vinyl acetate, 15 to 50 parts by weight of a high molecular weight copolymer of butadiene and acrylonitrile, 0.5 to 2 parts by weight of 2,2-di(p-hydroxyphenyl) propane and 0.5 to 2 percent based on the weight of the nitrile copolymer of a di-tertiary alkylated cresol having 4 to 5 carbon atoms per alkyl group.

8. In a method for hot fluxing a solid butadiene-acrylonitrile polymer and a resinous vinyl chloride polymer, the improvement which comprises carrying out the hot fluxing of the polymers in the presence of minor amounts of both 2,2-bis(p-hydroxyphenyl) propane and 2,6-di-tert-butyl-4-methyl phenol.

9. Composition according to claim 1 in which the bisphenol compound is 2,2-bis(4-hydroxy-3-methyl phenyl) propane.

10. A composition of matter comprising about 100 parts by weight of chlorinated polyethylene having a chlorine content between about 30 to 70%, and about 0.5 to 5.0 parts by weight of 2,2-di(p-hydroxyphenyl) propane as a stabilizer therefor.

11. In a method for hot fluxing a nitrile-diolefin polymer with a resinous vinyl chloride-vinyl acetate copolymer, the improvement which comprises carrying out the hot fluxing of the polymers in the presence of a minor amount, sufficient to stabilize the product formed, of an admixture of a di-tertiary ring-alkylated cresol having 4 to 5 carbon atoms per alkyl group and a bisphenol compound as defined in claim 1.

12. A composition of matter comprising 100 parts by weight of a chlorine-containing substantially saturated aliphatic resin-like polymer having a molecular weight above about 250 and having a combined chlorine content of about 30 to 70%, and about 0.5 to 5.0 parts by weight of 2,2-di(p-hydroxyphenyl) propane as a stabilizer.

References Cited in the file of this patent

UNITED STATES PATENTS

| | | |
|---|---|---|
| 1,989,788 | Calcott et al. | Feb. 5, 1935 |
| 2,625,521 | Fischer | Jan. 13, 1953 |

FOREIGN PATENTS

| | | |
|---|---|---|
| 147,952 | Australia | July 20, 1950 |